United States Patent
Ha

(10) Patent No.: US 9,336,293 B2
(45) Date of Patent: May 10, 2016

(54) DATA MANAGEMENT APPARATUS AND METHOD FOR SURVEILLANCE SYSTEM

(71) Applicant: HANWHA TECHWIN CO., LTD., Changwon-Si, Gyeongsangnam-Do (KR)

(72) Inventor: Ji-Yeon Ha, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 195 days.

(21) Appl. No.: 13/915,863

(22) Filed: Jun. 12, 2013

(65) Prior Publication Data

US 2013/0332420 A1  Dec. 12, 2013

(30) Foreign Application Priority Data

Jun. 12, 2012 (KR) .................. 10-2012-0062730
May 15, 2013 (KR) .................. 10-2013-0055107

(51) Int. Cl.
*G06F 17/30* (2006.01)
*H04N 21/231* (2011.01)
*H04N 7/18* (2006.01)

(52) U.S. Cl.
CPC .......... *G06F 17/30581* (2013.01); *H04N 7/181* (2013.01); *H04N 21/23113* (2013.01)

(58) Field of Classification Search
None
See application file for complete search history.

(56) References Cited

U.S. PATENT DOCUMENTS

| 4,258,418 | A | * | 3/1981 | Heath | G06F 5/10 710/53 |
|---|---|---|---|---|---|
| 6,163,338 | A | * | 12/2000 | Johnson et al. | 348/148 |
| 6,434,678 | B1 | * | 8/2002 | Menzel | 711/156 |
| 8,860,820 | B2 | * | 10/2014 | Busch | G08B 13/19669 348/207.1 |
| 2009/0122137 | A1 | | 5/2009 | Mambakkam et al. | |
| 2010/0235574 | A1 | * | 9/2010 | Umezuki | G06F 11/2087 711/114 |

FOREIGN PATENT DOCUMENTS

| JP | 2003-153177 A | 5/2003 |
|---|---|---|
| JP | 2007-13477 A | 1/2007 |
| JP | 2011-10179 A | 1/2011 |
| KR | 10-2006-0095218 A | 8/2006 |
| KR | 10-1 266481 B1 | 5/2013 |

* cited by examiner

*Primary Examiner* — Belix M Ortiz Ditren
(74) *Attorney, Agent, or Firm* — Sughrue Mion, PLLC

(57) ABSTRACT

Provided are a data management apparatus and a data management method for a surveillance system. The data management apparatus includes: a first storage unit configured to store therein data provided from a data input unit; a second storage unit configured to store therein a copy of the data; and a control unit configured to control the first storage unit to store the data therein on a real time basis, and if the data stored in the first storage unit is equal to or larger than a predetermined threshold amount, generate the copy and control the second storage unit to store the copy in the second storage unit as much as a given amount.

20 Claims, 5 Drawing Sheets

DATA MANAGEMENT APPARATUS AND METHOD FOR SURVEILLANCE SYSTEM

CROSS-REFERENCE TO RELATED APPLICATIONS

This application is based on and claims priority from Korean Patent Application No. 10-2012-0062730 filed on Jun. 12, 2012 and No. 10-2013-0055107 filed on May 15, 2013 in the Korean Intellectual Property Office, the disclosure of which is incorporated herein in its entirety by reference.

BACKGROUND

1. Field

Apparatuses and methods consistent with the exemplary embodiments relate to video management for a surveillance system, and more particularly, to video management for a surveillance system, which can improve recording performance of the surveillance system and reduce input/output (I/O) loads through separately implementing elements for storage only and elements for reproduction, backup, and overwrite.

2. Description of the Related Art

Recently, video surveillance systems using surveillance cameras, such as closed-circuit television (CCTV), have been rapidly spread. In such surveillance systems, data from the surveillance cameras is stored in real time in one physical hard disk drive or logical hard disk drive through a network. Further, recorded video can be confirmed using a client program, and the recorded video data can be backed up and stored in another storage medium.

FIG. 1A is a conceptual view explaining a storage operation of a surveillance system in the related art, FIG. 1B is a conceptual view explaining a backup operation of the surveillance system in the related art, and FIG. 1C is a conceptual view explaining a reproduction operation of the surveillance system in the related art.

In FIG. 1A, a surveillance system 1 in the related art registers a recording schedule for storing surveillance video data that is acquired by cameras 2. Further, the surveillance system 1 designates a hard disk 3 in which the acquired video data is to be stored. Then, the video data is stored in a file in the hard disk 3, which is designated by the user, in the order of time. Thereafter, if the designated hard disk is fully filled with the data, the oldest data in the hard disk 3 is searched for and deleted to store latest data instead.

In FIG. 1B, in the case where a user has set a backup start time and a backup end time, the video data file in the hard disk 3 is searched for and is converted into another format, and the surveillance data is stored in another storage medium 4, e.g., a digital versatile disk (DVD), an external hard disk, a universal serial bus (USB), a network drive, or the like. Here, the hard disk 3 is the same single hard disk.

In FIG. 1C, the data stored in the past can be confirmed through searching for, sending to a client, and reproducing the surveillance data stored in the hard disk 3 that is designated by the user. Here, the hard disk 3 is the same single hard disk.

According to the surveillance system 1 in the related art, however, one physical hard disk 3 serves to perform storage, reproduction, and backup of the data, and even if a plurality of physical hard disks 3 are provided, only one logical hard disk performs the storage, backup, and reproduction of the data.

The best write performance of a physical hard disk drive may be related to the size of a buffer of a memory. The video data that is received through a network is written as a file in the hard disk after being first stored in the buffer of the memory through a Network Interface Card (NIC), and at this time, the processing speed differs for about one second. That is, due to the low capacity that is the disadvantage of the memory and the low processing speed that is the disadvantage of the hard disk, the memory is unable to store a large amount of data, and the hard disk is unable to rapidly bring the data from the memory. At an initial stage, a plurality of hard disks are installed to overcome the disadvantage. The write speed at which one hard disk can theoretically process data may correspond to 100 MB, but in this case, it is required for the data to be sequentially input in the unit of 4 K without a read operation.

However, in the surveillance system, in which video data is received through a network, the data that comes through the network has a delay, and thus, it is unable to successively receive the data.

The write speed may be increased through using a plurality of hard disks. However, if many built-in hard disks are installed, many bus lines are connected to the hard disks, and thus, data is divided to be sent to the hark disks through the bus lines, rather than being simultaneously sent. This may cause reduction of the speed by 1/N.

In addition to the write of the video data, reproduction, backup, and overwrite of the video data are required. For example, while the latest video data is written, the past video data should be searched for to be sent to a client, or the oldest data should be searched for to be deleted to secure the hard disk capacity. Since an actuator of one hard disk searches for the data to perform reproduction, backup, and overwrite of the data, the write speed is lowered, and the hard disk is worn away to reduce the lifespan thereof.

Further, if the hard disk is unable to bring the video data that is stored in the memory, memory overflow occurs and the video data is lost. Accordingly, in order to store the video data at high picture quality that is set by a user without a video loss even in the case where the reproduction and the backup simultaneously occur, it is required for the video data to be stored in one physical hard disk at a write speed of up to 125 Mbps.

According to the surveillance system 1 in the related art, however, in the case where many surveillance cameras are connected to one surveillance system to reproduce videos which are simultaneously stored and to perform backup for long-term preservation of the surveillance data, the data from the surveillance cameras is stored in real time in one physical hard disk drive or one logical hard disk drive through a network, and thus, the performance of the surveillance system deteriorates due to the processing speed of the hard disk, reduction of the write speed caused by the reproduction and backup, and insufficient memory capacity.

SUMMARY

One or more exemplary embodiments are provided to address the above-mentioned problems occurring in the related art.

One or more exemplary embodiments are provided with regard to a video management apparatus and method for a surveillance system which may reduce I/O loads of the apparatus or system.

Various advantages and features of the inventive concept will be set forth in part in the description which follows and in part will become apparent to those having ordinary skill in the art upon examination of the following or may be learned from practice of the exemplary embodiments.

According to an aspect of an exemplary embodiment, there is provided a data management apparatus including: a first storage unit configured to store therein data provided from a data input unit; a second storage unit configured to store therein a copy of the data; and a control unit configured to control the first storage unit to store the data therein on a real time basis, and if the data stored in the first storage unit is equal to or larger than a predetermined threshold amount, generate the copy and control the second storage unit to store the copy in the second storage unit as much as a given amount.

According to an aspect of another exemplary embodiment, there is provided a data management method including: storing data provided from a data input unit in a first storage medium on a real time basis; if the data stored in the first storage medium is equal to or larger than a predetermined threshold amount, storing a copy of the data in a second storage medium as much as a given amount; if a capacity of the second storage medium is insufficient to store another copy of another data, overwriting the copy in the order in which the copy has been generated in given data units or file units; and if there is a user's reproduction request, searching for latest data in the first storage medium and searching for old data in the second storage medium.

According to an aspect of another exemplary embodiment, storage media, such as hard disks for storage only, and storage media, such as hard disks for reproduction, backup, and overwrite, divide their respective functions, and thus, the I/O loads of the storage media can be reduced.

Further, through configuration of the storage media, such as hard disks, by functions, the data such as video data can be stored in the storage media without a loss, and the storage media for reproduction, backup, and overwrite can send a larger amount of data to a client, and the storage media can perform backup using other storage media at higher speed.

BRIEF DESCRIPTION OF THE DRAWINGS

The above and other aspects will be more apparent from the following detailed description taken in conjunction with the accompanying drawings, in which.

DETAILED DESCRIPTION OF THE EXEMPLARY EMBODIMENTS

The inventive concept will now be described more fully hereinafter with reference to the accompanying drawings, in which exemplary embodiments are shown. This inventive concept may, however, be embodied in different forms and should not be construed as being limited to the embodiments set forth herein. Rather, these embodiments are provided so that this disclosure will be thorough and complete, and will fully convey the scope of the inventive concept to those skilled in the art. The same reference numbers indicate the same components throughout the specification. In the attached figures, the thickness of layers and regions is exaggerated for clarity.

The use of the terms "a" and "an" and "the" and similar referents in the context of describing the exemplary embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Hereinafter, exemplary embodiments of the inventive concept will be described in detail with reference to the accompanying drawings.

Figure 1A:
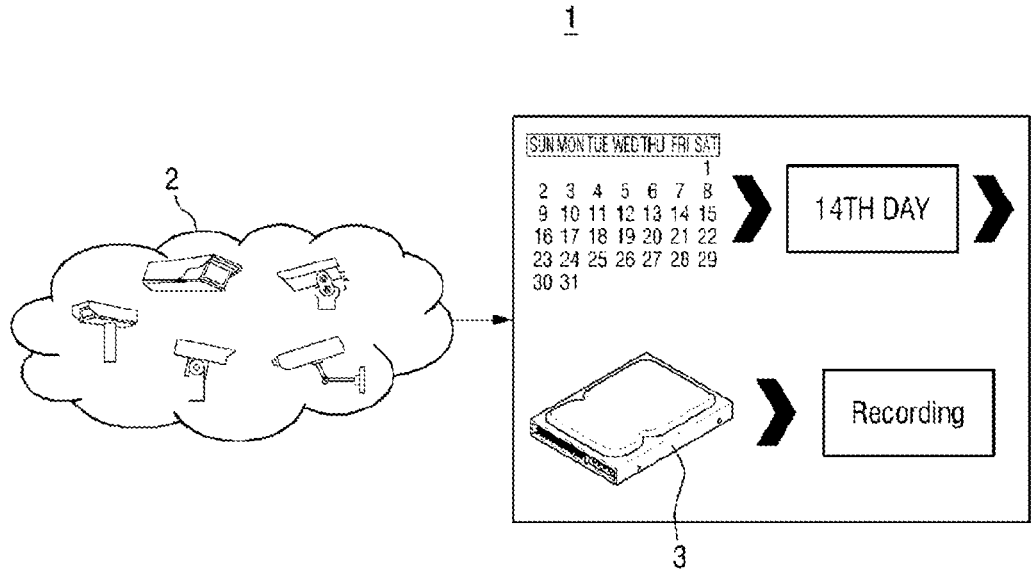
FIG. 1A is a conceptual view explaining a storage operation of a surveillance system in the related art.
Figure 1B:
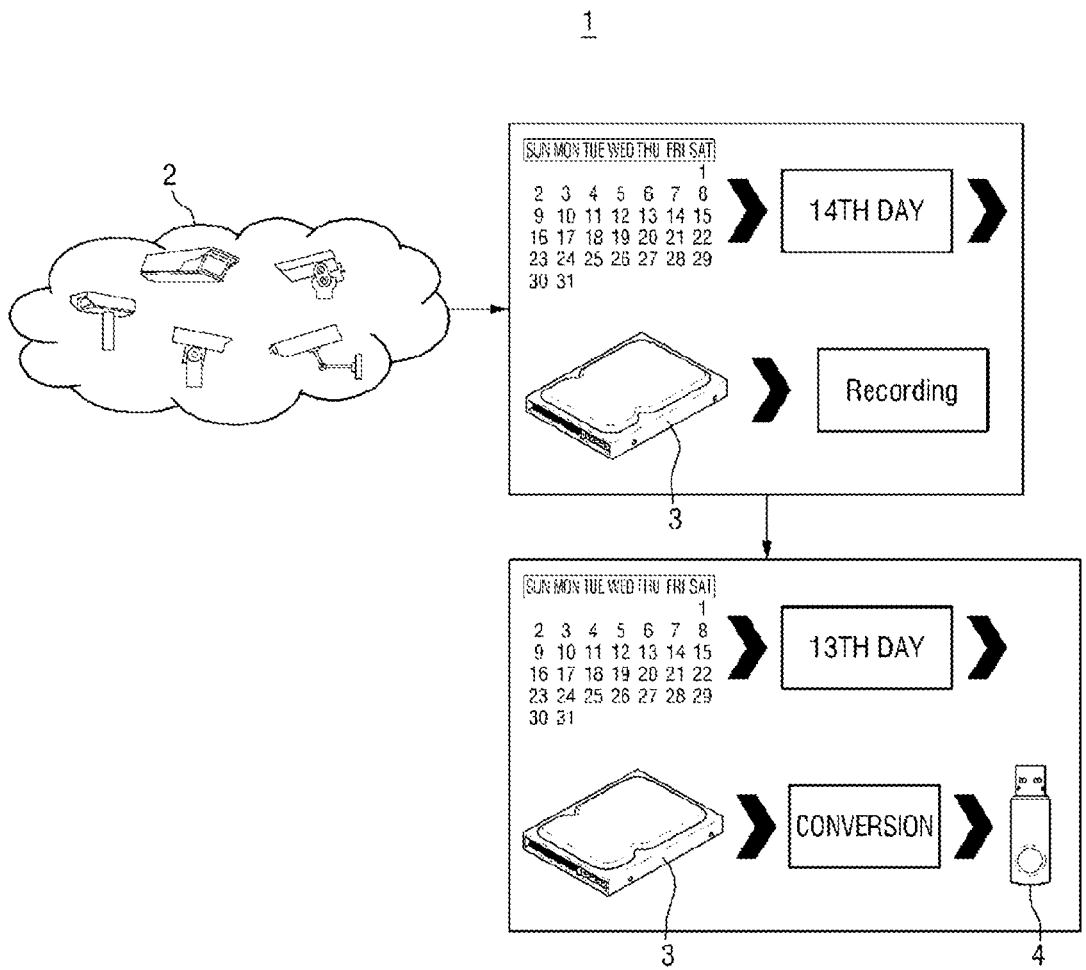
FIG. 1B is a conceptual view explaining a backup operation of the surveillance system in the related art.
Figure 1C:
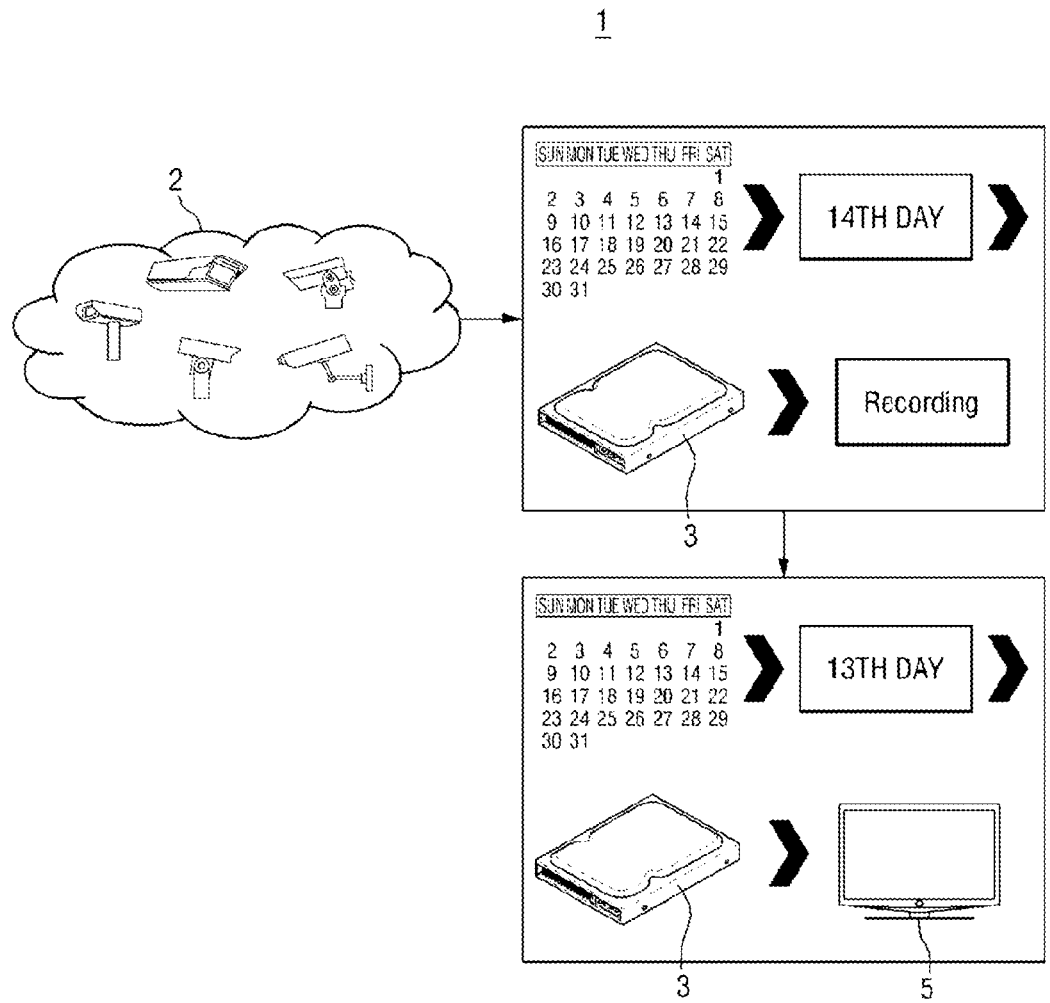
FIG. 1C are conceptual view explaining a reproduction operation of the surveillance system in the related art.
Figure 2:
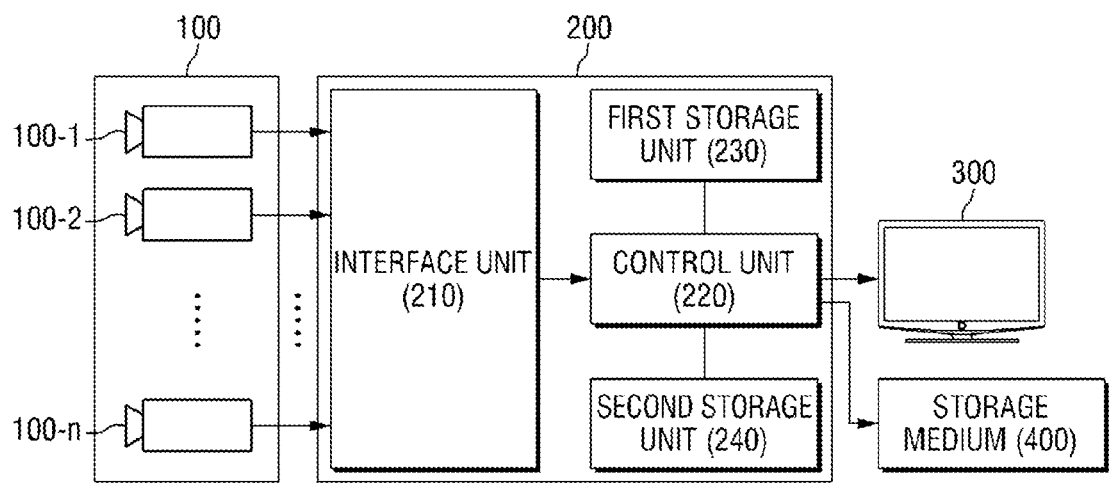
FIG. 2 is a diagram illustrating the configuration of a video management apparatus for a surveillance system according to an exemplary embodiment.
Figure 3:
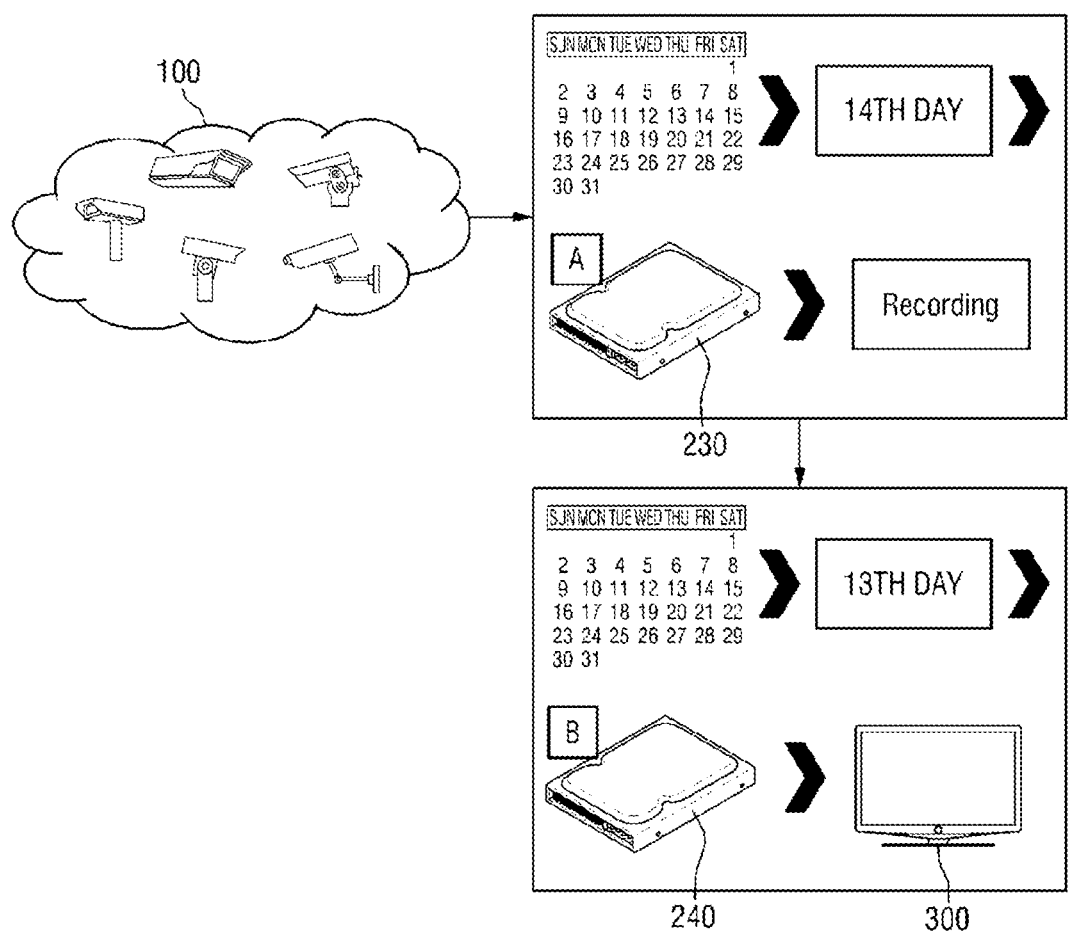
FIG. 3 is a conceptual view explaining the operation of the video management apparatus for a surveillance system according to an exemplary embodiment.

FIG. 2 is a diagram illustrating a configuration of a video management apparatus for a surveillance system according to an exemplary embodiment, and FIG. 3 is a conceptual view explaining an operation of the video management apparatus for a surveillance system according to an exemplary embodiment.

A surveillance system includes at least one camera 100, a video management apparatus for the surveillance system (hereinafter referred to as "video management apparatus") 200, a display device 300, and a separate external storage medium 400.

The video management apparatus 200 may include an interface unit 210, a control unit 220, a first storage unit 230, and a second storage unit 240.

At least one camera 100 is configured to acquire video and transfer video data to the video management apparatus 200 through the interface unit 210 of the video management apparatus 200.

The first storage unit 230 stores the video data that is acquired by the camera 100 and is transferred through the interface unit 210. That is, the first storage unit 230, which operates to store the video data with first priority, is a space in which the video data that is provided from the camera 100 is stored in real time.

The second storage unit 240 stores copied data of the video data that is stored in the first storage unit 230. That is, the second storage unit 240, which operates to store the copied data with first priority, is a space in which the video data that is provided from the camera 100 is indirectly stored in non-real time basis. In particular, if the video data that is stored in the first storage unit 230 is equal to or larger than a predetermined threshold amount, the video data is copied as much as the threshold amount and is stored in the second storage unit 240. According to another exemplary embodiment, if the video data that is stored in the first storage unit 230 is equal to or larger than the predetermined threshold amount, the video data is copied as much as a given amount and is stored in the second storage unit 240. Here, the given amount may be the same as the threshold amount or only an excess of the threshold amount.

Here, it is preferable, but not necessary, that the first or second storage unit 230 or 240 is one of a hard disk and a Solid State Disk (SSD). It will be apparent to those skilled in the art that the first or second storage unit may be another type of storage medium that can store data therein in addition to the hard disk or the SSD. Further, the first or second storage unit 230 or 240 may be at least one logical or physical space. For example, the first storage unit 230 may include two or more hard disks, and the second storage unit 240 may be only one hard disk. Further, if an SSD is used as the first storage unit 230, the performance of one SSD may correspond to the performance of two hard disks.

In general, hard disks have been widely used, but it is expected that SSDs will be mainly used in the future. Since SSDs do not use a read/write head to find data on a platter and an actuator arm as in hard disk drives, SSDs support a read/write speed that is higher than the read/write speed (e.g., 230 MB/s) of hard disks. However, SSDs cost much more than hard disks, and for example, SSDs presently cost about three dollars per gigabyte, while hard disks cost 10 to 20 cents per gigabyte. In the case of 3.5 inch desktop hard drives, the cost per gigabyte is 10 to 20 cents and the read/write speed is 100 MB/s. Accordingly, it may be appropriate for price and performance to use the 3.5 inch desktop hard drive as large capacity storage medium.

As described later, the first storage unit 230 is used for real-time storage, and the second storage unit 240 is used as a storage space of the copied data. Accordingly, it is preferable, but not necessary, that the storage speed of the first storage unit 230 is higher than the storage speed of the second storage unit 240.

The control unit 220 controls to store in real time the video data provided from the camera 100 in the first storage unit 230, and if the video data that is stored in the first storage unit 230 is equal to or larger than the predetermined threshold amount, the control unit 220 copies and controls to store the video data in the second storage unit 240 as much as the threshold amount. That is, the control unit 220 serves to control to store the video data in a real time storage space and in a copy storage space.

Further, the control unit 220 may perform reproduction of the video data stored in the first storage unit 230 and backup of the video data to an external storage medium 400. The control unit 220 may also perform reproduction of the copied data stored in the second storage unit 240, backup of the copied data to the external storage medium 400, and overwrite of old copied data stored in the second storage unit 240.

If a capacity of the second storage unit 240 is insufficient, the control unit 220 may overwrite the copied data in the second storage unit 240 in the order in which the copied data have been copied thereto in given data units or file units. Further, the control unit 220 may overwrite only data stored in the second storage unit 240, of which the copied data has been generated in the first storage unit 230, in the order in which the video data is provided from the camera 100 in the given data units or file units.

Further, since latest video data is stored in the first storage unit 230 and the copied data of old video data is stored in the second storage unit 240, the control unit 220 may search for and reproduce the video data that has not been copied in the first storage unit 230, and may search for and reproduce the copied data in the second storage unit 240. The data, which has been searched for in the first storage unit 230 and/or the second storage unit 240, is displayed through the display device 300.

Further, in consideration of a storage capacity of the first storage unit 230 and the second storage unit 240, the control unit 220 may copy the video data from the first storage unit 230 to the second storage unit 240 in accordance with a predetermined copy period. For example, in consideration of the time when 50% of the storage capacity of the first storage unit 230 is occupied, the control unit 220 may copy a corresponding portion of the video data stored in the first storage unit 230 to the second storage unit 240, and may delete that portion of the video data, of which copying has been completed, in the order of their age.

Further, in consideration of the storage capacity of the first storage unit 230 and the second storage unit 240, the control unit 220 may copy the video data from the first storage unit 230 to the second storage unit 240 once with an appropriate data size. For example, the control unit 220 may copy 25% of the entire storage capacity of the first storage unit 230 at one instance to store the copied data in the second storage unit 240, and may delete the copy-completed video data (the data size is 25% of the whole storage capacity) also at one instance.

At this time, the control unit 220 may sequentially copy the video data from the first storage unit 230 to the second storage unit 240 as much as the predetermined threshold amount. For example, if copying is simultaneously performed in case that hard disks are used as the first and second storage units 230 and 240, positions where files to be copied exist are frequently accessed, and thus, the copy speed is lowered to cause occurrence of a loss in storing the video data. Accordingly, it is preferable, but not necessary, to sequentially copy the video data. The control unit 220 may copy the video data from the first storage unit 230 to the second storage unit 240 as much as the predetermined threshold amount at one instance, as described above.

Further, the control unit 220 may control to store the video data of the first storage unit 230 and/or the copied data of the second storage unit 240 in a separate external storage medium 400. In this case, it is preferable, but not necessary, that the control unit 220 converts the video data of the first storage unit 230 and/or the copied data of the second storage unit 240 into different format data and transfers and stores the converted data in the external storage medium. Here, the separate external storage medium 400 may be one of a DVD, a compact disk (CD), an external hard disk, a USB memory, and a network drive, and it will be apparent to those skilled in the art that another storage medium may be included. Further, it is preferable, but not necessary, that a plurality of separate external storage media 400 are provided as a space for storing the video data of the first storage unit 230 and a space for storing the copied data of the second storage unit 240, but are not limited thereto.

Referring to FIG. 3, in the case where hard disks are used as the first storage unit 230 and the second storage unit 240, a hard disk A, which is the first storage unit 230, stores the data with first priority, and a hard disk B, which is the second storage unit 240, copies the data with first priority.

The hard disk A performs real time storage, reproduction of the latest video data, backup of the latest video data (to another storage medium), and copy of the video data to the hard disk B. Further, the hard disk B performs reproduction of the video data that is older than the video data stored in the hard disk A, backup of the video data stored in the hard disk B (to another storage medium), and overwrite to erase the oldest data if the hard disk B does not have an enough capacity.

An example, in which hard disks and surveillance cameras are currently used, will be described. For example, it is assumed that two physical hard disks that support 7200 rpm of SATA 2, 64 MB buffer are used.

The hard disk A may store the latest surveillance video data from the surveillance camera at a maximum speed of 250 Mbps. Preferably, but not necessarily, in consideration of a buffer capacity of the hard disk A, the hard disk A may store the video data from the surveillance camera at a maximum speed of 40 Mbps. At present, one physical hard disk can store data at a speed of 125 Mbps. Data storing at 250 Mbps in one hard disk becomes the basis of recording 10 3-mega surveillance cameras. The reproduction function supports reproduction of the video data that is recently stored in the hard disk A. Unlike the surveillance system in the related art, the reproduction function is not to find and reproduce the oldest data, and thus, the hard disk A does not have much load. The backup function converts the video data stored in the hard disk A and performs backup of the converted data to another storage medium (a DVD/CD, an external hard disk, a USB, or a network drive).

In periodically copying the video data to the hard disk B, the copy function may copy the video data to the hard disk B in a copy period set by a user. In the case of copying to hard disk B at one instance, an amount of the copied data should not exceed 2 GB, and simultaneous copying to hard disk B several times should not be performed. In the case of simultaneous copying, the hard disk simultaneously accesses positions where files exist, and a copy speed is lowered to cause occurrence of a loss in storing the video data. If copy is performed with a size of two GB one at a time, data storing at a speed of 250 Mbps corresponds to data storing at 32 bytes per second in the hard disk, and since it takes one minute to copy 2 GB to hard disk B, it can be supported that the latest video data can be copied to hard disk B as much as the stored video data. Preferably, but not necessarily, since the latest surveillance data is stored from the hard disk A to the surveillance camera at a speed of 40 Mbps, copy can be performed from the hard disk A to the hard disk B one at a time with a size of 90 MB.

In the case of the hard disk B, the reproduction function is the same as the reproduction operation of the hard disk A, but since the video data, which is older than the stored video data, is stored in the hard disk B, it is supported to search for and reproduce the old video data. If it is assumed that the capacity of the hard disk B is 8 TB on the assumption that storage is performed at a speed of 250 Mbps, the data of seven days is stored, and the reproduction is possible as much as the data of seven days. The backup function may perform backup to another medium (a DVD/CD, an external hard disk, a USB, or a network drive) like the backup of the hard disk A. The overwrite function is performed in a manner that if the latest video data is copied from the hard disk A in a state where the hard disk B is fully filled with data and further storage of data is not possible, the latest video data is stored in the hard disk B and the oldest data is deleted. However, it will be apparent to those skilled in the art that the overwrite function is not limited thereto.

If SSDs, which are low-priced and have large capacity, are launched in replacement of hard disks, about 20 3-mega cameras can be used in one surveillance system through the use of SSDs that are twice or more faster than hard disks.

Figure 4:
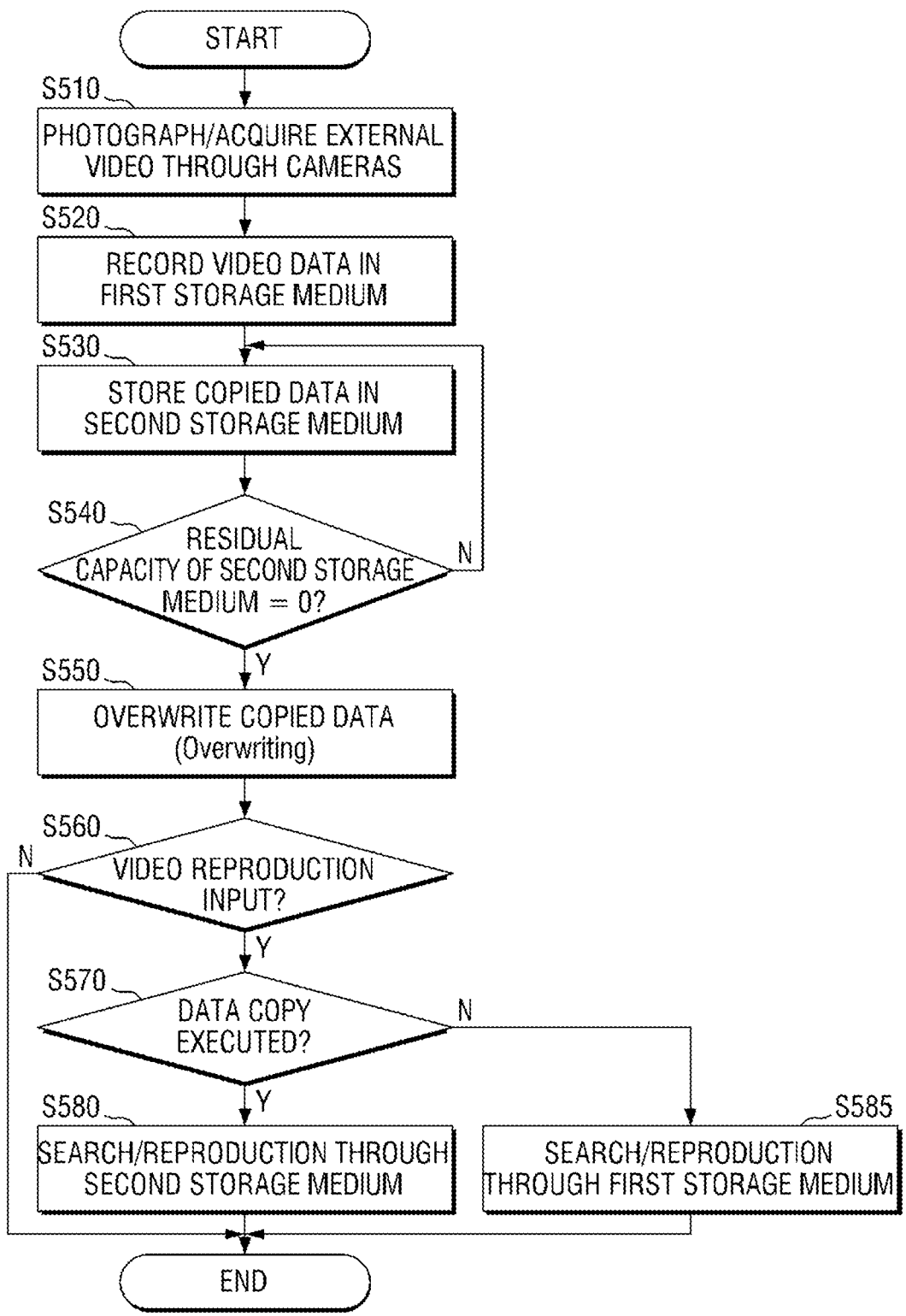
FIG. 4 is a flowchart of a video management method for a surveillance system according to an exemplary embodiment.
Figure 5:
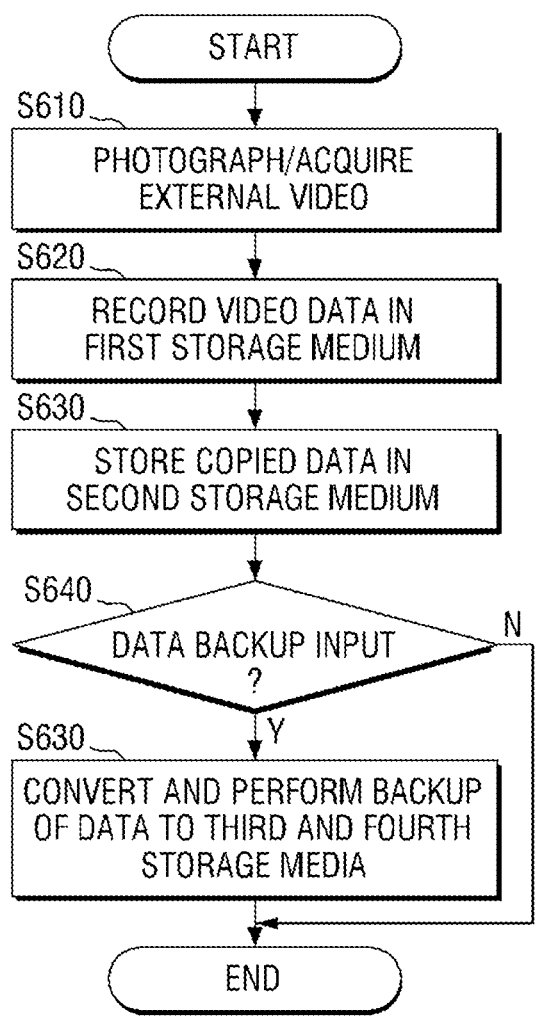
FIG. 5 is a detailed flowchart of a backup operation in a video management method for a surveillance system according to an exemplary embodiment.

FIG. 4 is a flowchart of a video management method for a surveillance system according to an exemplary embodiment, and FIG. 5 is a detailed flowchart of a backup operation in a video management method for a surveillance system according to an exemplary embodiment.

According to a video management method for a surveillance system (hereinafter referred to as a "video management method"), if a camera photographs and acquires an external video (S510), video data is recorded in a first storage medium (S520), and if the video data stored in the first storage medium is equal to or larger than a predetermined threshold amount, copied data, which is obtained by copying the video data that is stored in the first storage medium as much as the threshold amount, is stored in a second storage medium (S530). Accordingly, the latest video data is stored in the first storage medium, and the old video data is stored in the second storage medium. Here, the first or second storage medium may be one of a hard disk and an SSD, and it is preferable, but not necessary, that the storage speed of the first storage medium exceeds the storage speed of the second storage medium. Further, the first or second storage media may be at least one logically and physically. Preferably, but not necessarily, if two first storage media are provided, the video data can be recorded in the first storage medium with a record speed of 200 Mbps in S520. Since two first storage media are used, the recorded video data is 400 Mbps, and in terms of bytes, video of 50 MB per second is recorded, and a file of 300 MB is copied to the second storage medium. Time required to copy 300 MB is about three seconds.

Thereafter, if a capacity of the second storage medium is insufficient (S540), the copied data is overwritten in the second storage medium in the order in which the copied data were copied in the given data units or file units (550). In the case where the copy of the video data is performed in the first storage medium, the video data may be immediately deleted. However, for data protection, it is preferable, but not necessary, to delete only the video data, of which the copied data has been generated, in the first storage medium in the order in which the video data is provided from the camera in the given data units of file units.

Then, if there is a user's reproduction request, i.e., if there is a video reproduction input (S560), latest video data is searched for in the first storage medium (S585), and old video data is searched for in the second storage medium (S580) to reproduce the searched video. At this time, in order to reduce time for searching for the video data in the order of time, the storage medium in which the video data is to be searched for may be immediately confirmed on the basis of whether to execute the copy of the data (S570). For this, an event of the data, of which the copy has been executed, may be generated to be used during the search operation.

Further, the video data of the first storage medium and the copied data of the second storage medium may be backed up to other storage media. Referring to FIG. 5, if a camera photographs and acquires external video (S610), video data is recorded in the first storage medium (S620), and copied data of the video data that is stored in the first storage medium is stored in the second storage medium (S630). Thereafter, if there is a data backup request from a user (S640), the video data of the first storage medium may be converted, if necessary, and backed up to a third storage medium, and the copied data of the second storage medium may be converted, if necessary, and backed up to a fourth storage medium. Here, the third and fourth storage media correspond to separate external storage media. As described above, the external storage medium may be a DVD/CD, an external hard disk, a USB, or a network drive.

Other storage media may be used, and as an example, Redundant Array of Independent Disks or Redundant Array of Inexpensive Disks (RAID) may be used. The RAID is a technology in which partially redundant data is dividedly stored in several hard disks, and may also be called a redundant array of independent disks. Various methods for dividing data exist, and these methods are called levels. In accordance with the levels, various purposes can be satisfied, such as heightening of reliability of the storage device or improvement of the overall performance.

The RAID operates as one logical disk that ties several disks into one, and may include hardware RAID, host RAID, and software RAID.

The software RAID means using a RAID logic that has already been built in an operating system (OS). The software RAID does not require separate expenses, but a central processing unit (CPU) of the system is used to perform operations necessary for the RAID operation, and OS stability and RAID stability are in close relationship with each other. Accordingly, if the OS is unstable, the RAID volume also becomes unstable.

According to the host RAID, hardware takes charge of some engines, and software takes charge of the remaining engines. As a main chip iROC is used to replace PHY/CPU roles.

According to the hardware RAID, PHY, CPU, memories, and RAID engines are independently supported on a mode controller. The hardware RAID independently operates with almost no CPU burden of a mother board and high stability.

There are many built-in or external RAID cards that can be used in PCs. Using the RAID technology, the storage speed can be increased, and the backup can be easily performed. That is, by using the RAID function, write and read speeds can be increased.

According to the exemplary embodiments, in comparison to the surveillance system in the related art which simultaneously perform storage, backup, and overwrite with respect to a plurality of hard disks, the first storage medium (hard disk or SSD) for real-time storage of data that is acquired from the surveillance cameras and the second storage medium (hard disk or SSD) for copy of real-time stored data to perform storage, backup, and overwrite divide respective functions to reduce the )IO loads of the surveillance system. Through this, the first storage medium (hard disk or SSD) can store the video data without a loss, the second storage medium (hard disk or SSD), which performs backup, reproduction, and overwrite, can send a larger amount of video data to the client, and the first and second storage media (hard disk or SSD) can perform the backup to other storage media at higher speed.

On the other hand, the video management method for a surveillance system according to exemplary embodiments can be implemented as one module by software and hardware, and the embodiments as described above can be prepared as a program that can be executed in a computer, and can be implemented in a general-purpose computer that operates the program using a recording medium. The computer-readable recording medium may be implemented in the form of a magnetic medium, such as a ROM, a floppy disc, or a hard disk, an optical medium, such as a CD or a DVD, and a carrier wave, such as transmission through the Internet. Further, in the computer-readable recording medium, codes, which are distributed in a computer system connected through a network and which can be read by a computer in a distribution method, may be stored and executed.

While the inventive concept has been particularly shown and described with reference to the exemplary embodiments thereof, it will be understood by those of ordinary skill in the art that various changes in form and details may be made therein without departing from the spirit and scope of the inventive concept as defined by the following claims. For example, although the exemplary embodiments are directed to only management of video data, the inventive concept is not limited thereto. It is therefore desired that the present exemplary embodiments be considered in all respects as illustrative and not restrictive, reference being made to the appended claims rather than the foregoing description to indicate the scope of the inventive concept.

What is claimed is:

1. A data management apparatus, comprising:
    a first storage unit configured to store therein data provided from a data input unit;
    a second storage unit configured to store therein a copy of the data; and
    a control unit configured to control the first storage unit to store the data therein on a real time basis, and if the data stored in the first storage unit is equal to or larger than a predetermined threshold amount that is less than a storage capacity of the first storage, generate the copy and control the second storage unit to store the copy in the second storage unit as much as a given amount,
    wherein the control unit is configured to overwrite the copy in the order in which the copy has been generated in given data units or file units if a capacity of the second storage unit is insufficient to store another data.

2. The data management apparatus of claim 1, wherein the control unit is configured to overwrite only selected data of which a copy has been generated in the first storage unit in the order in which the selected data has been provided from the data input unit in given data units or file units.

3. The data management apparatus of claim 1, wherein the control unit is configured to search for in the first storage unit and reproduce data that has not been copied to the second storage unit, and search for in the second storage unit and reproduce data that has been copied to the second storage unit.

4. The data management apparatus of claim 1, wherein the control unit is configured to sequentially generate the copy the data in given data units or file units as much as the given amount.

5. The data management apparatus of claim 1, wherein the control unit is configured to generate the copy of the data as much as the given amount at one instance.

6. The data management apparatus of claim 1, wherein the control unit is configured to convert the data in the first storage unit and perform backup of the converted data to a separate storage medium.

7. The data management apparatus of claim 1, wherein the control unit is configured to convert the copy in the second storage unit and perform backup of the converted copy to a separate storage medium.

8. The data management apparatus of claim 6, wherein the separate storage medium is one of a digital versatile disk, a compact disk, an external hard disk, a universal serial bus memory, and a network drive.

9. The data management apparatus of claim 7, wherein the separate storage medium is one of a digital versatile disk, a compact disk, an external hard disk, a universal serial bus memory, and a network drive.

10. The data management apparatus of claim 1, wherein the predetermined threshold amount and the given amount are the same.

11. A data management method comprising:
    storing data provided from a data input unit in a first storage medium on a real time basis;
    if the data stored in the first storage medium is equal to or larger than a predetermined threshold amount that is less than a storage capacity of the first storage, storing a copy of the data in a second storage medium as much as a given amount;
    if a capacity of the second storage medium is insufficient to store another copy of another data, overwriting the copy in the order in which the copy has been generated in given data units or file units; and
    if there is a user's reproduction request, searching for latest data in the first storage medium and searching for old data in the second storage medium.

12. The data management method of claim 11, wherein the first or second storage medium is one of a hard disk, a solid state disk (SSD), a digital versatile disk, a compact disk, and a network drive, and a speed of storing the data in the first storage medium is greater than a speed of storing the copy in the second storage medium.

13. The data management method of claim 11, further comprising overwriting only selected data of which a copy has been generated in the first storage medium in the order in which the selected data is provided from the data input unit in the given data units or file units.

14. The data management method of claim 11, further comprising converting the data in the first storage medium and performing backup of the converted data to a third storage medium.

15. The data management method of claim 11, further comprising converting the copy in the second storage medium and performing backup of the converted copy to a fourth storage medium.

16. The data management method of claim 11, wherein the predetermined threshold amount and the given amount are the same.

17. The data management method of claim 11, wherein the predetermined threshold amount is less than a storage capacity of the first storage medium.

18. The data management method of claim 11, wherein the predetermined threshold amount is 50 percent of a storage capacity of the first storage medium.

19. The data management apparatus of claim 1, wherein the predetermined threshold amount is 50 percent of the storage capacity of the first storage.

20. The data management apparatus of claim 1, wherein the first or second storage unit is one of a hard disk, a solid state disk (SSD), a digital versatile disk, a compact disk, and a network drive.

* * * * *